United States Patent [19]
Hurvitz

[11] Patent Number: 4,549,796
[45] Date of Patent: Oct. 29, 1985

[54] SYSTEM FOR CONTROLLING THE OPERATION OF A CAMERA AND PROJECTOR

[76] Inventor: James S. Hurvitz, 2351 Physicians Dr., Baton Rouge, La. 70808

[21] Appl. No.: 515,877

[22] Filed: Jul. 22, 1983

[51] Int. Cl.⁴ ............................................. G03B 19/18
[52] U.S. Cl. .................................. 352/133; 352/174; 353/15; 355/64
[58] Field of Search .................. 355/64; 352/174, 133; 353/15

[56] References Cited

U.S. PATENT DOCUMENTS

| 2,567,499 | 9/1951 | Vaughn | 353/15 |
| 2,811,588 | 10/1957 | Julie | 353/15 |
| 3,026,769 | 3/1962 | Thiele et al. | 353/15 |
| 3,183,770 | 5/1965 | Nyman et al. | 355/64 |
| 3,342,103 | 9/1967 | Fabrey | 353/15 |

Primary Examiner—Monroe H. Hayes
Attorney, Agent, or Firm—Thorpe, North & Western

[57] ABSTRACT

A system for controlling the winding and exposure of film in a camera and the changing of slides in a slide projector to enable the camera to photograph the transparencies in the projector. The system includes two control units, one for responding to audio signals for controlling the operation of the camera, and the other for likewise responding to audio signals for controlling the operation of the projector. The audio signals for controlling the camera are recorded on one track of a stereo cassette tape and the signals for controlling the projector are stored on the other track and interleaved in time. A cassette tape player is coupled to the control units to alternately supply signals to one control unit and then to the other. The control units include speakers so that the audio signals may be broadcast to provide an indication to the user of the status of the photographing procedure.

6 Claims, 1 Drawing Figure

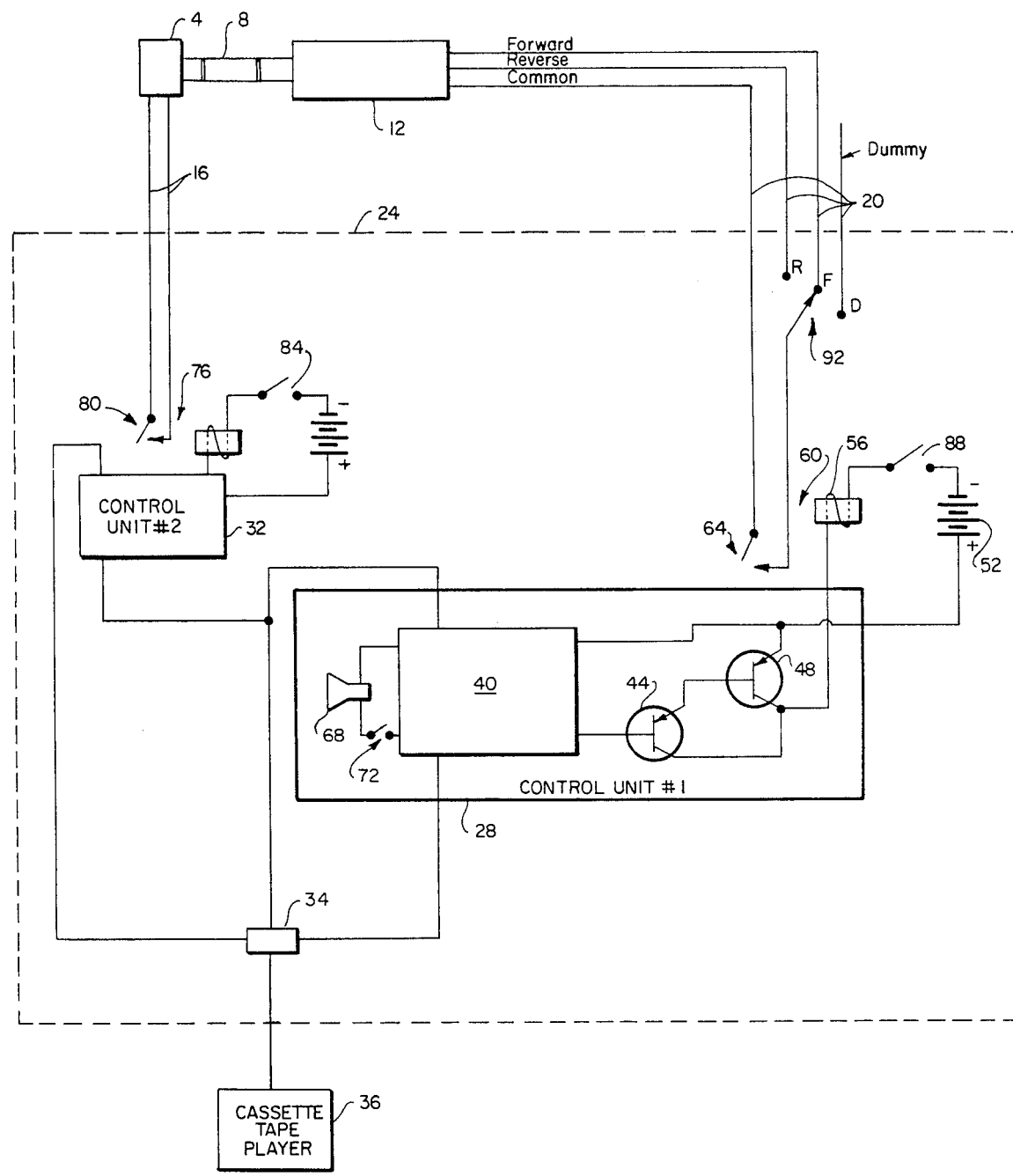

SYSTEM FOR CONTROLLING THE OPERATION OF A CAMERA AND PROJECTOR

BACKGROUND OF THE INVENTION

The present invention relates to a system for controlling and synchronizing the operation of a camera and projector to enable the camera to automatically photograph transparencies in the projector.

As indicated in co-pending U.S. application, Ser. No. 484,278, there is a need for a simple, efficient and inexpensive system for reproducing color transparencies such as slides. The aforesaid application describes such a system to include an attachment by which a camera may be coupled directly to a projector to enable the camera to photograph slide transparencies contained in the projector. There is no disclosure for operating such a system other than manually and this could be somewhat time consuming and tedious.

SUMMARY OF THE INVENTION

It is an object of the invention to provide a system for controlling and synchronizing the operation of a camera and projector to enable the camera to automatically wind and photograph transparencies in the projector and to enable the projector to automatically advance or retreat.

It is also an object of the invention to provide such a system which gives an audible indication of the operation of the system.

It is a further object of the invention to provide such a system which may be adapted for use in controlling the operation of a projector and in providing audio narration during the operation of the projector.

The above and other objects of the invention are realized in a specific illustrative embodiment of apparatus used in conjunction with a camera with an attached winder motor which responds to wind signals for moving film contained in the camera from one frame to the next and for exposing the film, and with a projector which responds to "forward" signals for moving film or slides contained in the projector forward to the next frame or slide and responds to "reverse" signals for moving film or slides backward to the previous frame or slide. The apparatus includes a storage device such as a cassette tape player and cassette tape for producing first and second sets of signals interleaved in time, a first control circuit responsive to the first set of signals for producing "forward" and "reverse" signals, a second control circuit responsive to the second set of signals for producing and applying "wind" signals to the camera, and a selector switch having at least first and second positions for applying "forward" signals to the projector when the switch is in the first position and "reverse" signals to the projector when the switch is in the second position.

In accordance with one aspect of the invention, the first set of signals constitutes audio signals which, when broadcast, are reproduced as a sequence of spoken numbers. The first control circuit also includes an audio speaker for broadcasting the spoken numbers, and a detection circuit for applying a "forward" or "reverse" signal to the projector for each number of the audio signals received to thereby cause the projector to move the film or slides in the projector to the next or previous frame respectively.

BRIEF DESCRIPTION OF THE DRAWING

The above and other objects, features and advantages of the invention will become apparent from a consideration of the following detailed description presented in connection with the accompanying drawing which shows apparatus and circuitry for controlling the operation of a camera and a projector and made in accordance with the principles of the present invention.

DETAILED DESCRIPTION

Referring to the drawing, there is shown a single lens reflex camera 4 having a winder motor which responds to wind signals for moving the film in the camera from one frame to the next and for automatically exposing each frame of the film. An exemplary camera is the Olympus OM2 35 MM camera. The camera 4 is coupled by way of a camera attachment 8, such as that described in the aforecited co-pending application, to a slide projector 12. The projector 12 is adapted to respond to what will be referred to as "forward" and "reverse" signals to respectively move the slide carousel or holder forward to the next slide frame or backward to the previous slide frame. An exemplary projector is the Kodak carousel slide projector (model 5600).

Coupled to the camera 4 by way of a pair of conductors 16 and to the projector 12 by way of three conductors 20 is the control system 24 of the present invention. Included in the system are a pair of control units 28 and 32. These control units respond to signals received from a conventional stereo cassette tape player 36. Signals for controlling the operation of the camera 4 and projector 12 are voice signals recorded on both channels or tracks of a two-channel tape placed in the cassette tape player 36. In particular, the voice signals for controlling the operation of the camera 4 are recorded on one channel and the voice signals for controlling the operation of the projector 12 are recorded on the other channel, with the signals being interleaved in time as needed for proper control. For example, the signals for controlling the operation of the projector 12 could consist of the spoken numerals "36", "35", "34", etc. The signals for controlling the operation and winding of the camera 4 could consist of the spoken word "picture". The signals would be interleaved in time so that when the tape on which the signals were recorded was played, the output would be "36", "picture", "35", "picture", "34", "picture", etc.

As the cassette tape player 36 is played, the signals for controlling the camera 4 are applied to control unit 32 via a signal splitter 34, and the signals for controlling the operation of the projector 12 are applied to the control unit 28 likewise via the signal splitter 34. Each control unit is constructed the same, and so only control unit 28 will be described. The control unit 28 includes a conventional voice operated device 40 for detecting audio signals (the spoken numerals) received from one of the tracks of the tape in the cassette tape player 36. Detection of such signals results in turning on of a transistor 44 which, in turn, causes a transistor 48 to turn on. With transistor 48 in the "on" condition, current from a battery 52 is conducted through a winding 56 of a relay 60 causing the relay to operate and close contact elements 64. As will be discussed momentarily, this action serves to signal the projector 12 either to advance the slides forward by one, or to backup the slides by one.

The control unit 28 also includes a speaker 58 coupleable by way of a switch 72 to the cassette tape player 36.

When the switch 72 is closed, audio signals applied by the cassette tape player 36 to the control unit 28 are broadcast. That is, the spoken numbers "36", "35", etc., recorded on one channel of the cassette tape in the cassette tape player 36 are broadcast to enable the user to select the number of slides he wishes to copy. For example, the cassette tape player 36 would be played and the numbers counted down until that number corresponding to the number of slides desired to be copied, e.g., 24, had been broadcast. Then, the cassette tape player 36 would be stopped, the system initialized (appropriate switches set), and the system restarted from that number. That number of slides would thus automatically be photographed.

Control unit 32 is constructed exactly the same as control unit 28 to control the operation of the camera 4. Audio signals applied to the control unit 32 are detected and relay 76 is caused to operate to close contact elements 80. This action serves to signal the camera to cause the camera to wind the film forward one frame and to expose the film.

Control of the camera 4 and projector 12 may be disabled by opening switches 84 and 88 respectively. A selector switch 92 is coupled between the relay 60 and two of the leads 20. The selector switch 92 includes a wiper terminal for selectively coupling the stationary contact element of relay 60 to one of the three leads 20. When the switch 92 is set to contact lead "F", and relay 60 is energized, the projector 12 is caused to move the slide holder forward one slide. When the switch 92 is set to contact lead "R" and the relay is energized, the projector 12 is caused to reverse the slide holder one slide. And when the switch 92 is placed in contact with the lead labelled "D", operation of the relay 60 causes no action to be taken by the projector 12.

The control system of the drawing has been described for use in controlling the photographing by camera 4 of slides contained in a projector 12. However, the control system could also be utilized simply to control a slide presentation by a projector. This would be done by recording a voice narration to be played with the presentation of the slides on one track of a stereo cassette tape and recording the slide changing signals (either voice signals or oscillator signals) on the other track interspersed in time throughout the narration. The voice narration would be applied to control unit 32 for broadcasting by the speaker of that control unit while the slide changing signals would be applied to control unit 28 for signaling a projector connected to the conductors 20, to successively move the slide holder forward. Of course, conductors 16 either would not be coupled to a camera or switch 84 would be opened so that no "wind" signals would be generated.

In the manner described, a simple, efficient and inexpensive control system is provided for controlling and synchronizing the operation of a camera in photographing transparencies in a projector. Although the projector was discussed as being a slide projector, it should be understood that filmstrip or other type projectors could also be utilized. Also, a cassette tape player was described as the source of control signals, but other storage devices could also be utilized for supplying the necessary control signals to the control units of the system. Although a recorded audio narration signal was discussed as being the trigger for the voice operated devices, it should be understood that a recorded oscillator signal may also be used to trigger control units 28 and 32.

It is to be understood that the above-described arrangements are only illustrative of the principles of the present invention. Numerous modifications and alternative arrangements may be devised by those skilled in the art without departing from the spirit and scope of the invention and the appended claims are intended to cover such modifications and arrangements.

What is claimed is:

1. Apparatus for controlling and synchronizing the operation of a camera with a motor winder and a projector, where the camera is responsive to wind signals and moving film in the camera from one frame to the next and for exposing the film, and where the projector is responsive to forward signals for moving the film or slides forward to the next frame or slide and is responsive to reverse signals for moving the film or slides backward to the previous frame or slide, said apparatus comprising
   means for producing first and second sets of signals interleaved in time, said first set of signals comprising audio signals for broadcasting as a sequence of spoken numerals,
   first control means responsive to the first set of signals for producing forward and reverse signals, said first control means including
      audio speaker means,
      a speaker switch which, when operated, applies said first set of signals to the audio speaker means for broadcasting, and
      detection means for applying a forward or reverse signal to the projector for each numeral in the audio signals received to thereby cause the projector to move the film or slides in the projector to the next or previous frame respectively,
   second control means responsive to the second set of signals for producing and applying wind signals to the camera, and
   selector switch means having first, second and third positions for applying forward signals to the projector when in the first position, reverse signals to the projector when in the second position, and no signals when in the third position.

2. Apparatus as in claim 1 wherein the numerals of the first set of signals are in descending order, beginning with a numeral whose value corresponds to the total number of frames of the film in the camera.

3. Apparatus as in claim 2 wherein said signal producing means comprises a tape player containing a tape on which the first and second set of signals are recorded.

4. Appartus as in claim 3 wherein said tape is a tape cassette having left and right tracks, and wherein said first set of signals is recorded on the left track and the second set of signals is recorded on the right track.

5. Apparatus as in claim 1 wherein said second set of signals comprises audio signals consisting of spoken words, and wherein said second control means includes
   second audio speaker means,
   a speaker switch which, when operated, applies said second set of signals to the second audio speaker means for broadcasting, and
   detection means for applying a wind signals to the camera with attached winder motor for each word in the audio signal received to thereby cause the camera to move the film in the camera and expose the film.

6. Apparatus as in claim 1 wherein said first control means further includes coupling means for connecting the apparatus to the projector, said coupling means comprising a common conductor, a forward conductor and a reverse conductor, said selector switch being connected to the forward conductor when in the first position and to the reverse conductor when in the second position, and wherein said detection means includes closure switch means for connecting the common conductor to the selector switch means when activated, and means for detecting the numerals received from the signal producing means and for activating the closure switch means for each numeral received.

* * * * *